United States Patent [19]

Dehennau et al.

[11] Patent Number: 4,774,146

[45] Date of Patent: Sep. 27, 1988

[54] FLEXIBLE THERMOPLASTIC STRUCTURES WITH MULTIPLE COEXTRUDED POLYMERIC LAYERS COMPRISING A VINYLIDENE CHLORIDE COPOLYMER LAYER BONDED TO A PLASTICIZED VINYL CHLORIDE POLYMER LAYER

[75] Inventors: Claude Dehennau, Waterloo; Jean Demey, Gesves, both of Belgium

[73] Assignee: Solvay & CIE, Brussels, Belgium

[21] Appl. No.: 72,167

[22] Filed: Jul. 10, 1987

[30] Foreign Application Priority Data

Jul. 11, 1986 [FR] France .................. 6 10317

[51] Int. Cl.$^4$ .............................................. B32B 27/08
[52] U.S. Cl. .................... 428/518; 428/520; 264/176.1; 426/127
[58] Field of Search .................... 428/518, 520

[56] References Cited

U.S. PATENT DOCUMENTS

| | | | |
|---|---|---|---|
| 3,953,660 | 4/1976 | Ishida | 428/518 |
| 4,133,926 | 1/1979 | Vorrier et al. | 428/200 |
| 4,288,488 | 9/1981 | Hisazumi et al. | 428/518 X |
| 4,320,175 | 3/1982 | Hisazumi et al. | 428/518 |

FOREIGN PATENT DOCUMENTS

| | | |
|---|---|---|
| 0095526 | 4/1982 | |
| 0079731 | 5/1982 | European Pat. Off. |
| 2043533 | 1/1980 | United Kingdom . |

OTHER PUBLICATIONS

European Search Report 1987

*Primary Examiner*—P. C. Ives
*Attorney, Agent, or Firm*—Stevens, Davis, Miller & Mosher

[57] ABSTRACT

The flexible thermoplastic structures comprise a vinylidene chloride copolymer layer bonded to a plasticized vinyl chloride polymer layer through the intermediacy of a mixture of polymeric adhesives consisting of 10 to 90 parts by weight of a copolymer of vinyl acetate and ethylene and of 90 to 10 parts by weight of a copolymer of vinyl chloride and vinyl acetate and whose shear elastic modulus G' at 121° C. and $10^{-4}$ cycles/second is greater than $0.5 \cdot 10^3$ Pa.

The flexible thermoplastic structures with coextruded polymeric layers may be in the form of films, sheets, tetra-packs or flexible pouches capable of being employed in the packaging field.

8 Claims, No Drawings

FLEXIBLE THERMOPLASTIC STRUCTURES WITH MULTIPLE COEXTRUDED POLYMERIC LAYERS COMPRISING A VINYLIDENE CHLORIDE COPOLYMER LAYER BONDED TO A PLASTICIZED VINYL CHLORIDE POLYMER LAYER

The present invention relates to flexible thermoplastic structures with multiple coextruded polymeric layers comprising a vinylidene chloride copolymer layer bonded to a plasticized vinyl chloride polymer layer, and to the use of these structures for the manufacture of flexible packages.

It is well known to improve the gas and vapour imperviousness of various packages made of bulk thermoplastic polymers by combining them with a vinylidene chloride copolymer in a structure with multiple polymeric layers. Coextrusion, that is to say simultaneous extrusion through a single die, is a particularly suitable application technique for combining various thermoplastic polymer layers in a single operation.

Patent Application FR-A-84/11,630 (SOLVAY & Cie) describes rigid thermoplastic structures with five coextruded polymeric layers comprising a central vinylidene chloride copolymer layer bonded on each side to a rigid polyvinyl chloride structural layer through the intermediacy of intermediary adhesive layers consisting of a vinyl chloride polymer whose gel temperature and dynamic viscosity at 180° C. and 1 s$^{-1}$ are lower than those of the adjacent polyvinyl chloride forming the structural layer.

It has now been found that, when the rigid polymer in such structures was replaced with a plasticized vinyl chloride polymer, the adhesion between the plasticized polyvinyl chloride and vinylidene chloride copolymer layers was nil.

Patent BE-A-640,999 (SOLVAY & Cie) recommends the use of copolymers of vinyl chloride and of vinyl acetate for bonding together flexible (plasticized) polyvinyl chloride sheets by hot pressing. When use is made of such copolymers of vinyl chloride and acetate for coextrusion bonding of a plasticized polyvinyl chloride layer to a vinylidene chloride copolymer layer, adhesive bonds of a value which is acceptable at ambient temperature are obtained. However, after a heat treatment such as welding or steam sterilization, the adhesion becomes very weak, to such an extent that the layers delaminate and numerous small cracks appear over the entire surface of the structure.

It is known, furthermore, to employ latices of copolymers of vinyl acetate and ethylene with a predominant content of vinyl acetate to bond flexible polyvinyl chloride or vinylidine chloride copolymers onto various substrates, such as wood and textiles (Double liaison 1974, 21, June, p. 263-267). When such copolymers were employed as a polymeric anchor layer in the coextrusion of vinylidene chloride copolymers and of plasticized polyvinyl chloride, adhesive bonds were obtained which, both at ambient temperature and after heat treatment, were of a quality superior to that offered by the abovementioned vinyl chloride and acetate copolymers. Nevertheless, considerable creases due to sliding of the layers over each other made their appearance, making the multilayer composite unappealing and unusable in practice.

The present invention is intended to provide flexible thermoplastic structures with multiple coextruded polymeric layers in which a vinylidene chloride copolymer layer is bonded to a plasticized vinyl chloride polymer layer, which do not possess the above mentioned disadvantages.

To this end, the invention, as characterized in the claims, provides thermoplastic structures with multiple polymeric layers having high resistance to delamination both at ambient temperature and after sterilization with steam at 121° C., and whose surface shows neither folds nor small cracks.

The invention thus lies essentially in the use of a mixture of polymeric adhesives consisting of 10 to 90 parts by weight of a copolymer of vinyl acetate and ethylene and of 90 to 10 parts by weight of a copolymer of vinyl chloride and vinyl acetate and whose shear elastic modulus G' at 121° C. and 10$^{-4}$ cycles/second is greater than 0.5 10$^3$ Pa for bonding and producing adhesion of a layer of vinylidene chloride copolymer to a layer of plasticized vinyl chloride polymer.

The flexible thermoplastic structures with coextruded polymeric layers according to the invention thus comprise at least three layers, namely a layer of plasticized vinyl chloride polymer (A) bonded to a layer of vinylidene chloride copolymer (C) through the intermediacy of an adhesive layer according to the invention (B) (structure ABC). They may, of course, contain a greater number of layers. Thus, the outer face of the vinylidene chloride copolymer layer (C) may be bonded to a thermoplastic polymer other than polyvinyl chloride (E), such as, for example, a polyolefin, a copolymer of ethylene and vinyl acetate, a polyester or a polyamide, through the intermediary of an appropriate adhesive layer (D) (asymmetric structure ABCDE). Nevertheless, preference is given to symmetrical structures with five layers consisting of a central layer of vinylidene chloride copolymer (C) bonded on each side to a layer of plasticized vinyl chloride polymer (A) through the intermediacy of an adhesive layer according to the invention (B) (structure ABCBA).

A surprising feature of the invention lies in the production of adhesion values which are markedly higher than those provided by copolymers of vinyl acetate and ethylene, on the one hand, and the copolymers of vinyl chloride and vinyl acetate, on the other hand, and of thermoplastic structures of attractive appearance whose surface is neither cracked nor creased.

A "copolymer of vinyl acetate and ethylene" is intended to denote the copolymers of vinyl acetate and ethylene containing at least 50% by weight of vinyl acetate. The best results are obtained with binary copolymers of vinyl acetate and ethylene containing from 60 to 95% by weight of vinyl acetate and, still more particularly, with those containing from 65 to 85% by weight of vinyl acetate, to which preference is consequently given.

The polymers of vinyl acetate and ethylene are polymers which are more or less tacky and, consequently, difficult to process. In order to moderate this disadvantage, it is particularly advantageous to use a vinyl acetate copolymer coated with a thermoplastic polymer. According to a particularly preferred embodiment of the invention, a copolymer of vinyl acetate and ethylene which is coated with a thermoplastic polymer is therefore employed. By way of examples of such thermoplastic polymers there may be mentioned vinyl or vinylidene fluoride polymers and vinyl chloride polymers. A thermoplastic coating polymer which is most particularly preferred is polyvinyl chloride. The thermoplastic coating polymer is generally present in a proportion of at most approximately 10% by weight of the coated acetate polymer.

The coating of the vinyl acetate polymer with a thermoplastic polymer may be carried out, for example, by the addition of a thermoplastic polymer latex to a vinyl acetate polymer latex and coagulation of the whole, for example by the addition of an electrolyte.

A "copolymer of vinyl chloride and vinyl acetate" is intended to denote copolymers of vinyl chloride and vinyl acetate containing at least 50% by weight of vinyl chloride. The best results are obtained with binary copolymers of vinyl chloride and acetate containing from 60 to 98% by weight of vinyl chloride and, still more particularly, with those containing from 80 to 95% by weight of vinyl chloride.

The relative proportions of vinyl acetate copolymer and vinyl chloride copolymer in the mixture of polymeric adhesives may vary over a wide range.

Nevertheless, preference is given to a proportion of 25 to 75 parts by weight of copolymer of vinyl acetate and ethylene per 75 to 25 parts by weight of copolymer of vinyl chloride and vinyl acetate. The best results are obtained with a mixture of approximately equal weights.

According to a preferred embodiment of the invention, the mixture of polymeric adhesives thus comprises a copolymer of vinyl acetate and ethylene containing from 65 to 85% by weight of vinyl acetate and a copolymer of vinyl chloride and vinyl acetate containing from 80 to 95% by weight of vinyl chloride in approximately equal proportion by weight.

It has been found, furthermore, that particularly advantageous results are produced, both from the standpoint of adhesion and of the surface appearance of the coextruded thermoplastic structures, when the shear elastic modulus $G'$ at 121° C. and $10^{-4}$ cycles/second of the mixture of adhesive polymers is higher than $1 \cdot 10^3$ Pa.

"Vinyl chloride polymer" is intended, in this case, to denote polymers containing at least 70% by weight of monomer units derived from vinyl chloride. Thus, the vinyl chloride polymers which can be employed for the production of the multilayer composites according to the invention include both homopolymers of vinyl chloride and its copolymers containing monomer units derived from one or more comonomers and mixtures thereof. By way of nonlimiting examples of such comonomers of vinyl chloride there may be mentioned olefins such as ethylene, propylene and styrene, and esters such as vinyl acetate and alkyl acrylates and methacrylates. Preference is given to vinyl chloride homopolymers.

"Plasticized vinyl chloride polymer" is intended to denote vinyl chloride polymers such as defined above, whose Shore A hardness, measured according to ASTM Standard D2240, does not exceed 95, and preferably 90. Shore A hardness is usually at least 60. By way of examples of such plasticized polymers, there may be mentioned those containing approximately 35 to 75 parts by weight of plasticizer and, preferably, at least 40 parts by weight of plasticizer per 100 parts by weight of vinyl chloride polymer. The plasticizers which can be used may be chosen indiscriminately from the usual monomeric or polymeric plasticizers for vinyl chloride polymers. By way of non-limiting examples of such plasticizers, there may be mentioned phthalates, sebacates, adipates, trimellitates, citrates, phosphates and polyesters such as poly-ε-caprolactone and mixtures thereof.

Use may also be made of so-called internally plasticized vinyl chloride polymers produced by copolymerization of vinyl chloride with plasticizing comonomers such as, for example, ethylhexyl acrylate.

"Vinylidene chloride copolymer" is intended to denote vinylidene chloride copolymers containing from 60 to 95% by weight of vinylidene chloride, the remainder consisting of one or more ethylenically unsaturated comonomers such as, for example, vinyl chloride, acrylic and methacrylic acids and esters, and acrylic and methacyrlic nitriles. Nevertheless, preference is given to binary copolymers of vinylidene chloride and vinyl chloride containing approximately 75 to 85% by weight of vinylidene chloride.

Understandably, each of the constituent polymers of the multiple layer structures according to the invention may contain the usual additives employed in the application of this polymer, such as, for example, lubricants, plasticizers, heat stabilizers, light stabilizers, fillers, pigments, and the like. It may be advantageous to incorporate a small quantity, for example up to approximately 10% by weight, of the mixture of the adhesive polymers in the constituent polymers of the multiple layer structures.

In order to produce the multilayer structures according to the invention use may be made of the usual techniques for coextrusion through a flat or round, feedblock or multimanifold die. These techniques are characterized in that the molten polymer streams forming the various layers come together and travel together in the molten state before the single die exit. Nevertheless, preference is given to the multilayer structures coextruded through a multimanifold die and, still more particularly, through a round multimanifold die.

The thickness of the polymer layers which make up the multilayer composites according to the invention and the total thickness of the said structures is not critical and depends, of course, on the use for which they are intended and on the required degree of imperviousness. To give an idea, the total thickness of the thermoplastic multilayer structures is generally between 130 and 3,500 microns, and preferably between 180 and 2,000 microns. The thickness of the vinylidene chloride copolymer layer is generally between 10 and 850 microns, and preferably between 20 and 500 microns, and that of the intermediary layers which provide the adhesion is between 1 to 100 microns, and preferably between 2 and 50 microns. The multilayer structures according to the invention may therefore be in the form of films, sheets, tetra-packs and flexible pouches. They may be employed advantageously for the manufacture of packages for food-stuff, pharmaceutical and cosmetological products. The symmetrical flexible multilayer structures with five polymeric layers coextruded through a round multimanifold die are most particularly suitable for the manufacture of sterilizable tetra-packs and pouches for packaging nutrient or physiological liquids and, in particular, blood, solution or dialysis pouches.

The examples which follow are intended to illustrate the invention without, however, limiting it.

Examples 1 to 7 relate to flexible annular thermoplastic structures with five coextruded layers ABCBA. In examples 1 and 2, according to the invention, and in example 5, for comparison, the adhesive layers B consist of an equal-weight mixture of copolymer of vinyl acetate and ethylene and of copolymer of vinyl chloride and vinyl acetate. In example 3, for comparison, the adhesive layers B consist of a copolymer of vinyl acetate and ethylene. In example 4, also for comparison, the adhesive layers B consist of a copolymer of vinyl chloride and vinyl acetate. In examples 6 and 7, according to the invention, the adhesive layers B consist of mixtures of copolymer of vinyl acetate and ethylene and of copolymer of vinyl chloride and vinyl acetate in the following proportions by weight: 50-50(example 6) and 75-25 (example 7). The composition and the shear elastic modulus G' at 121° C. and a stress frequency of $10^4$ cycles/second of the adhesives employed in examples 1 to 7 are shown in Table 1, appended.

The elasticity modulus G' is evaluated in a rheogoniometer in which the sample is placed between two plane discs and subjected to shear deformations of low amplitude at frequencies of between $10^{-1}$ and $10^2$ cycles per second. The temperatures investigated range from 100° C. to 140° C., so as to permit an evaluation of the modulus at 121° C. and a frequency of $10^{-4}$ cycles per second.

The premixes employed for the layers A (plasticized polyvinyl chloride) and C (vinylidene chloride copolymer), prepared in a fast mixer, have the following composition by weight:

Layer A

Polyvinyl chloride, K value 71: 100
Diethylhexyl phthalate: 44
Epoxidized soya oil: 4.2
Calcium-zinc stabilizer: 0.4

Layer C

Vinylidene chloride copolymer containing 22.5% by weight of vinyl chloride: 100
Epoxy stabilizer: 4
Colloidal silica: 0.2
External lubricant: 0.3

In order to manufacture the coextruded structures according to examples 1 to 7, three single-screw type extruders A, B and C are arranged to feed a multimanifold coextrusion head insofar as the feeding of the various resins is concerned and of annular cross-section insofar as the main channel in which the molten multilayer composite flows is concerned.

Extruder A has a screw length of 20 times the diameter and a compression ratio of 3. It extrudes plasticized polyvinyl chloride. The displayed heating temperatures, ranging from the feed zone to the pumping zone, are 136° C.-162° C.-171° C.-176° C.

Extruder B has a screw length of 25 times the diameter and a compression ratio of 4. It extrudes the polymeric adhesives B. The displayed heating temperatures, ranging from the feed zone to the pumping zone, are given in Table II, appended, for the five evaluated types of adhesives B.

Extruder C has a screw length of 20 times the diameter and a compression ratio of 4. It extrudes vinylidene chloride copolymer. The displayed heating temperatures, ranging from the feed zone to the pumping zone, are 130° C. and 150° C.

The throughputs of the three extruders are adjusted so as to adjust the thickness of the layers in the final multilayer composite. The thicknesses obtained are shown in Table III, appended.

The coextrusion head is fed with plasticized polyvinyl chloride by means of a splitter set at 180° C. which separates the main stream from extruder A into two secondary streams so as to form the inner and outer layers of the multilayer sheath.

The coextrusion head is fed with adhesive by means of a second splitter set at 145° C. which separates the main stream of adhesive from extruder B into two secondary streams so as to form the two adhesive layers situated on each side of the central layer C, made of vinylidene chloride copolymer.

The coextrusion head is fed directly with vinylidene chloride copolymer by extruder C via a connection set at 136° C.

The five members of the multimanifold coextrusion head, which assemble the various layers A, B and C into an annular shape, are maintained, respectively, at 178° C. in the case of the two members fed with plasticized polyvinyl chloride, 178° C. in the case of the two members fed with adhesive and 136° C. in the case of the member fed with vinylidene chloride copolymer. The final die for sizing the molten multilayer composite is heated to 178° C. It has a diameter of 27.4 mm, the core having a diameter of 25.8 mm. The multilayer sheath is inflated while molten by means of air injection and, as soon as it has left the die, is sized by means of a gauge 32 mm in diameter before reeling.

In order to evaluate the adhesion (delamination resistance) of the multilayer composites, 1×10 cm specimens are cut form the cooled sheath. The adhesion is evaluated at 23° C. in a tensometer in accordance with a method similar to the ASTM Standard D1876-72. The adhesion is also evaluated using other specimens cut from the sheath after sterilization with steam at 121° C., for 30 minutes. The results of the adhesion evaluation, before and after sterilization, are shown in Table IV, appended.

The multilayer sheath obtained is also cut into sections 10 cm in length. These are closed by welding at one end, filled with water to a depth of 5 cm and closed by folding and mechanical clamping at the other end to form tetra-packs. These are then subjected to a sterilization by heating at 121° C. for 30 minutes using steam. The surface appearance of the tetra-packs after sterilization, and the evaluation of the degree of slip at the weld of the plasticized polyvinyl chloride layers external ($A_E$) and internal ($A_I$) in relation to the middle layer of vinylidine chloride copolymer C are shown in Table V, appended.

TABLE I

| Example No. | Adhesive composition | | | | Modulus G' of the adhesive, Pa |
|---|---|---|---|---|---|
| | VA-E* copolymer | | VC-VA** copolymer | | |
| | VA content % by wt. | MI,*** g/10 min | VC content % by wt. | K value | |
| 1 | 85 | 2.6 | 90 | 57 | 2 $10^3$ |
| 2 | 70 | 13.9 | 90 | 60 | 3.8 $10^3$ |
| 3 | 85 | 2.6 | none | — | 4.7 $10^2$ |
| 4 | none | — | 85 | 50 | 1.5 $10^2$ |
| 5 | 85 | 2.6 | 85 | 50 | 4.7 $10^2$ |
| 6 | 80 | 2.6 | 90 | 60 | 2.5 $10^3$ |
| 7 | 80 | 2.6 | 90 | 60 | 1.5 $10^3$ |

*VA-E copolymer = copolymer of vinyl acetate and ethylene
**VC-VA copolymer = copolymer of vinyl chloride and vinyl acetate
***MI = melt index at 170° C. under a 10 kg load

TABLE II

| Example No. | Temperatures (°C.) displayed on the single-screw extruder B from the feed zone to the pumping zone | | |
|---|---|---|---|
| 1 | 123 | 148 | 170 |
| 2 | 123 | 148 | 170 |
| 3 | 113 | 139 | 154 |
| 4 | 100 | 131 | 150 |
| 5 | 128 | 140 | 163 |
| 6 | 115 | 140 | 155 |
| 7 | 115 | 140 | 155 |

TABLE III

| Example No. | Thickness of the layers, μm | | | | |
|---|---|---|---|---|---|
| | Internal A plasticized PVC | B Adhesive(s) | C PVDC | B Adhesives | External A plasticized PVC |
| 1 | 114 | 36 | 21 | 43 | 201 |
| 2 | 131 | 25 | 24 | 17 | 144 |
| 3 | 141 | 17 | 19 | 20 | 131 |
| 4 | 110 | 43 | 22 | 37 | 126 |
| 5 | 142 | 12 | 20 | 19 | 125 |
| 6 | 114 | 26 | 37 | 63 | 114 |
| 7 | 113 | 29 | 39 | 51 | 134 |

TABLE IV

| Example No. | Adhesion at 23° C., newton/cm | |
|---|---|---|
| | Before sterilization | After sterilization* |
| 1 | 14.7 | 10.4 |
| 2 | 15.2 | 16.7 |
| 3 | 11.4 | 5.8 |
| 4 | 5.6 | 1.4** |
| 5 | 10 | 2.6 |
| 6 | 16.4 | 16.2 |
| 7 | 13.2 | 16.9 |

*Measured 72 h after sterilization
**Tetra-packs not sterilizable, break during sterilization.

TABLE V

| Example No. | Surface appearance of the tetra-packs after sterilization | Slip between the layers, mm | |
|---|---|---|---|
| | | $A_E/C$ | $A_I/C$ |
| 1 | no creases, no small cracks | 0–0.35 | 0–0.15 |
| 2 | no creases, no small cracks | 0.1–0.15 | 0–0.15 |
| 3 | many creases | 0.6 | 0.3 |
| 4 | creases and many small cracks | 0.7 | 0.4 |
| 5 | many creases | 1.8 | 0.5 |
| 6 | no creases, no small cracks | 0.16 | 0.18 |
| 7 | no creases, no small cracks | 0.39 | 0.28 |

We claim:

1. A flexible thermoplastic structure with multiple coextruded polymeric layers comprising a vinylidene chloride copolymer layer bonded to a plasticized vinyl chloride polymer layer, wherein the vinylidene chloride copolymer layer is bonded to the plasticized vinyl chloride polymer layer by means of an adhesive layer consisting of a mixture of polymeric adhesives containing from 10 to 90 parts by weight of a binary copolymer of vinyl acetate and ethylene containing from 60 to 95% by weight of vinyl acetate and from 90 to 10 parts by weight of a binary copolymer of vinyl chloride and vinyl acetate containing from 60 to 98% by weight of vinyl chloride and whose shear elastic modulus G' at 121° C. and $10^{-4}$ cycles/second is greater than $0.5 \cdot 10^3$ Pa.

2. The flexible thermoplastic structure with multiple coextruded polymeric layers according to claim 1, wherein the binary copolymer of vinyl acetate and ethylene contains from 65 to 85% by weight of vinyl acetate and wherein the binary copolymer of vinyl chloride and vinyl acetate contains from 80 to 95% by weight of vinyl chloride.

3. The flexible thermoplastic structure with multiple coextruded polymeric layers according to claim 1, wherein the mixture of polymeric adhesives contains from 25 to 75 parts by weight of copolymer of vinyl acetate and ethylene and from 75 to 25 parts by weight of copolymer of vinyl chloride and vinyl acetate.

4. The flexible thermoplastic structure with multiple coextruded polymeric layers according to claim 1, wherein the mixture of polymeric adhesives has a shear elastic modulus G' at 121° C. and $10^{-4}$ cycles/second which is greater than $1 \cdot 10^3$ Pa.

5. The flexible thermoplastic structure with multiple coextruded polymeric layers according to claim 1, wherein said structure contains three layers consisting of a layer of plasticized vinyl chloride polymer bonded to a layer of vinylidine chloride copolymer by means of a layer consisting of a mixture of copolymer of vinyl acetate and ethylene and of copolymer of vinyl chloride and vinyl acetate.

6. The flexible thermoplastic structure with multiple coextruded polymeric layers according to claim 1, wherein said structure contains five layers consisting of a central layer of vinylidine chloride copolymer bonded on each side to a layer of plasticized vinyl chloride polymer by means of a layer consisting of a mixture of copolymer of vinyl acetate and ethylene and of copolymer of vinyl chloride and vinyl acetate.

7. A flexible thermoplastic structure with multiple coextruded polymeric layers according to claim 6 constituting a sterilizable or a tetra-pack intended for packaging nutrient or physiological liquids.

8. A flexible thermoplastic structure with multiple coextruded polymeric layers according to claim 1 constituting a flexible package for foodstuff, pharmaceutical or cosmetological products.

* * * * *